United States Patent
Timmins et al.

(10) Patent No.: US 9,423,585 B2
(45) Date of Patent: Aug. 23, 2016

(54) FIBER OPTIC CONNECTIVITY SYSTEM

(71) Applicant: Optical Cable Corporation, Roanoke, VA (US)

(72) Inventors: Ian J. Timmins, Asheville, NC (US); Sumio Seo, Wallingford, VT (US); Stephen Porach, Asheville, NC (US)

(73) Assignee: Optical Cable Corporation, Roanoke, VA (US)

( * ) Notice: Subject to any disclaimer, the term of this patent is extended or adjusted under 35 U.S.C. 154(b) by 6 days.

(21) Appl. No.: 14/610,689

(22) Filed: Jan. 30, 2015

(65) Prior Publication Data

US 2015/0219858 A1 Aug. 6, 2015

Related U.S. Application Data

(60) Provisional application No. 61/934,247, filed on Jan. 31, 2014.

(51) Int. Cl.
  *G02B 6/00* (2006.01)
  *G02B 6/44* (2006.01)
  *G02B 6/38* (2006.01)

(52) U.S. Cl.
  CPC ............ *G02B 6/4452* (2013.01); *G02B 6/3817* (2013.01); *G02B 6/3897* (2013.01); *G02B 6/4453* (2013.01); *G02B 6/4455* (2013.01)

(58) Field of Classification Search
  CPC .. G02B 6/4452; G02B 6/4471; G02B 5/4454; G02B 6/4455; G02B 6/4453; G02B 6/46; G02B 6/3887; G02B 23/16

USPC .......................................... 385/100, 134–137
See application file for complete search history.

(56) References Cited

U.S. PATENT DOCUMENTS

| | | | |
|---|---|---|---|
| 7,505,664 B2 | 3/2009 | Weinert | |
| 7,509,015 B2 * | 3/2009 | Murano | G02B 6/4453 135/134 |
| 7,668,431 B2 | 2/2010 | Cox et al. | |
| 2010/0061064 A1 * | 3/2010 | Murano | H04Q 1/144 361/725 |
| 2013/0077927 A1 * | 3/2013 | O'Connor | G02B 6/4452 385/135 |

* cited by examiner

*Primary Examiner* — Kaveh C Kianni
*Assistant Examiner* — Hung Lam
(74) *Attorney, Agent, or Firm* — The Van Winkle Law Firm; David M. Carter; William G. Heedy

(57) ABSTRACT

A fiber optic connectivity system for fiber optic cable management comprising a main chassis surrounding an interior cavity and including a main opening and a plurality of access points; a door assembly adjacent to the main opening including at least one mounting accessory aperture that is sized and configured for engaged receipt of a mounting accessory component, and said door assembly being selectively positionable between a closed position and an open position for accessing the interior cavity; a tray supported on a rail on the interior facing surface of the main chassis, and the tray being selectively slideable upon the rail; a plurality of grommets each being integrally secured within a respective one of the access points, and each of the grommets being sized and configured for passage of at least one cable therethrough; and an adapter bracket on the tray being sized and configured for accommodating at least one fiber optic adapter plate thereon.

18 Claims, 16 Drawing Sheets

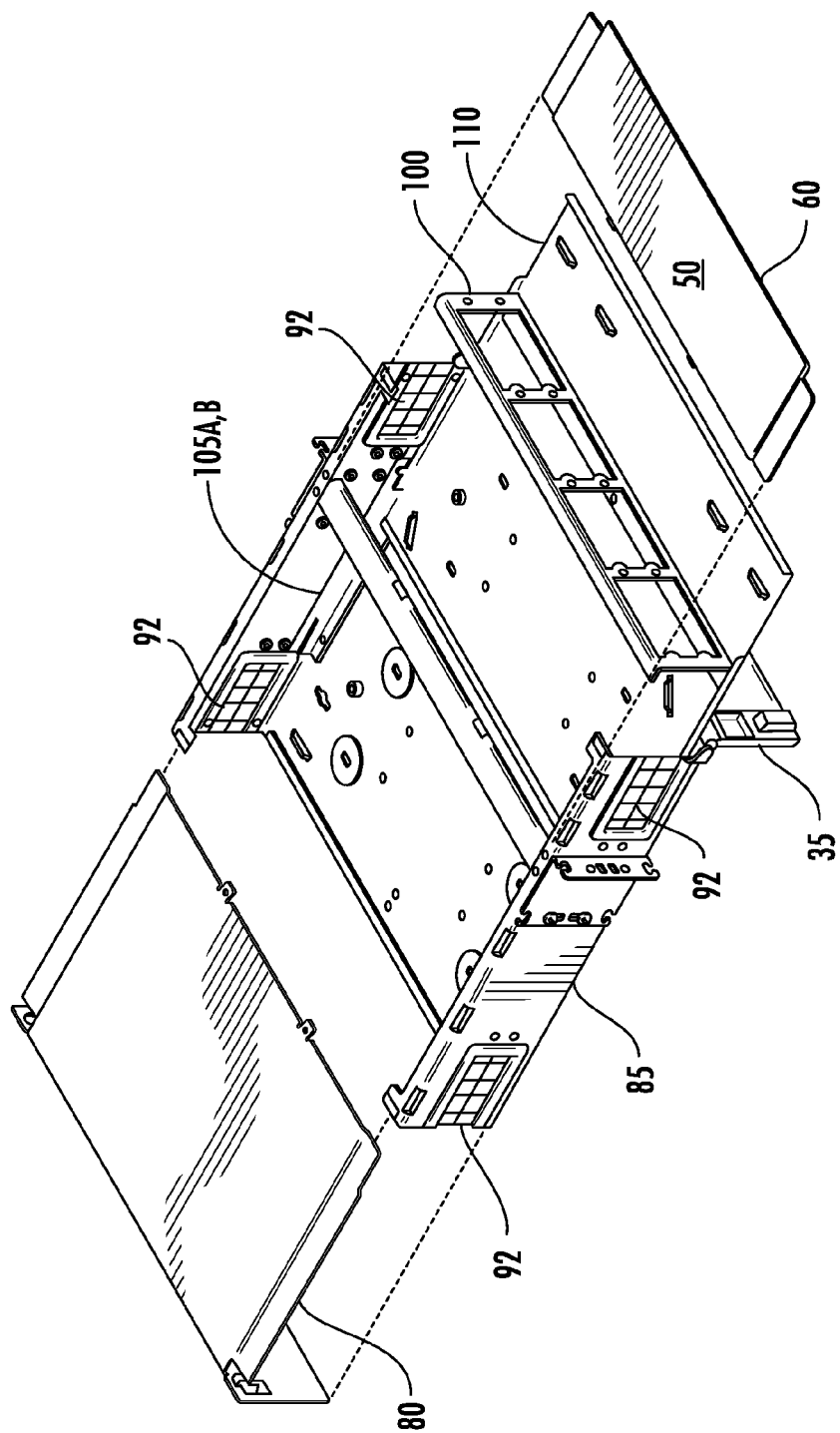

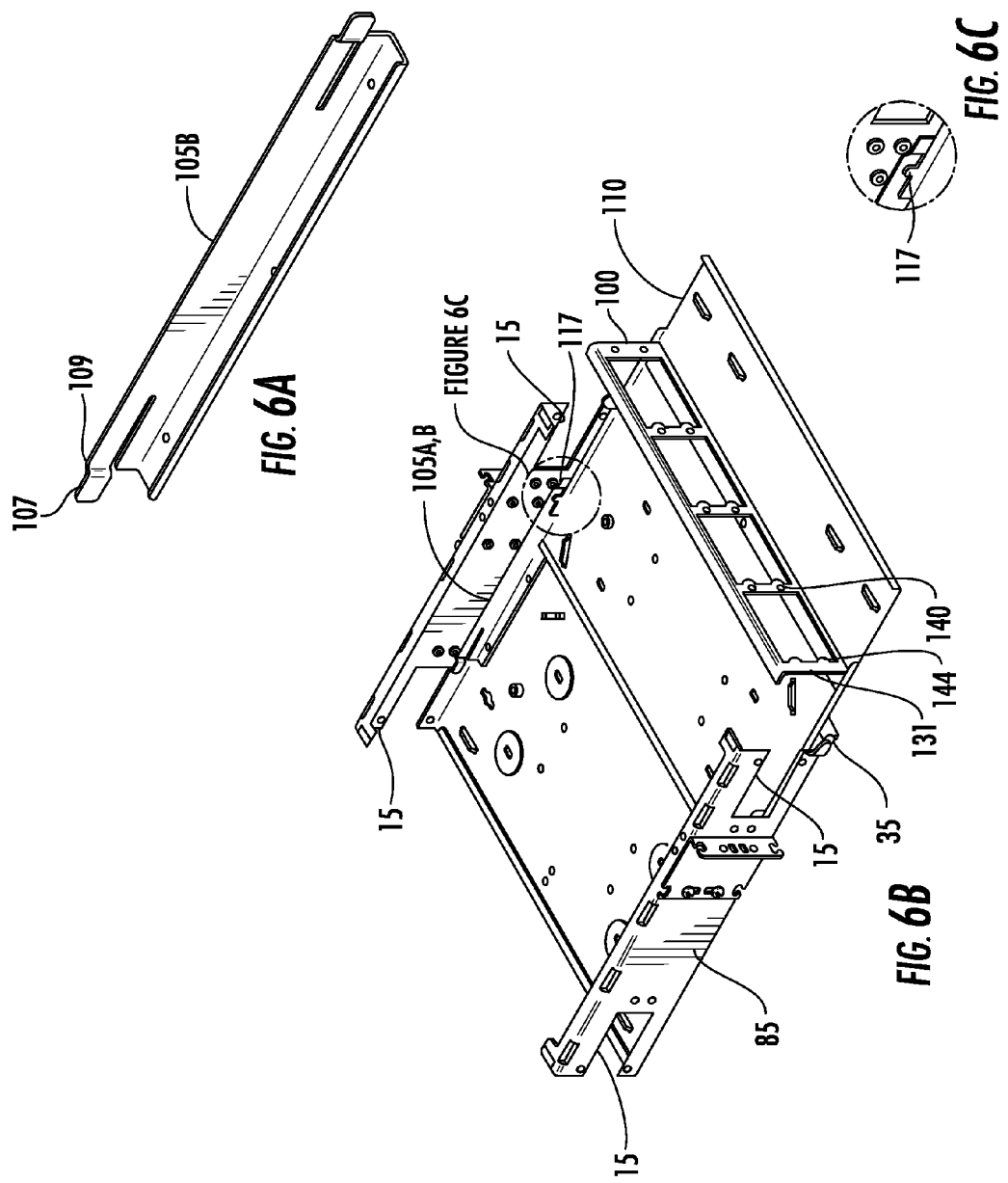

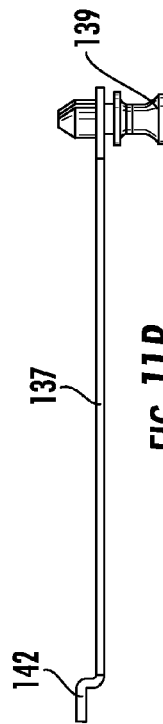
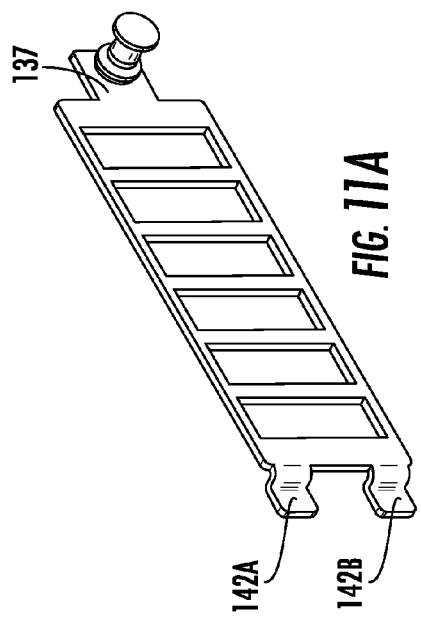
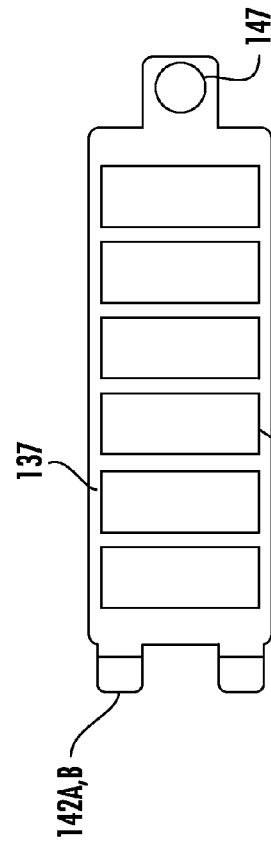
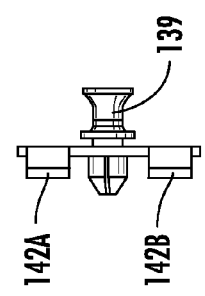

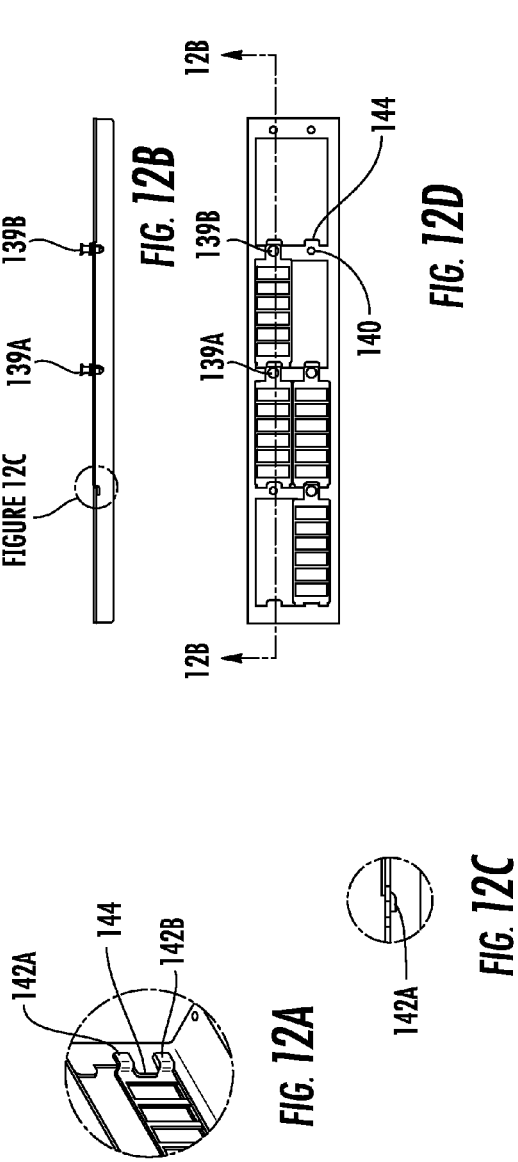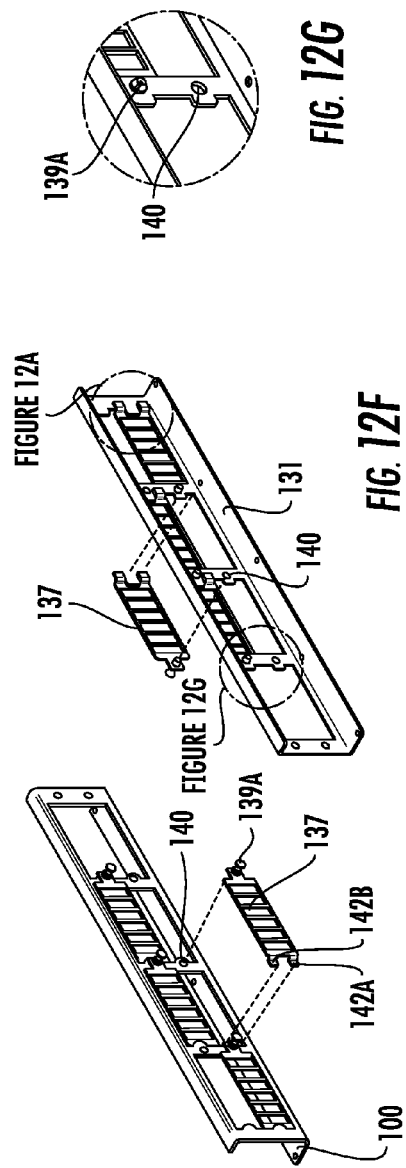

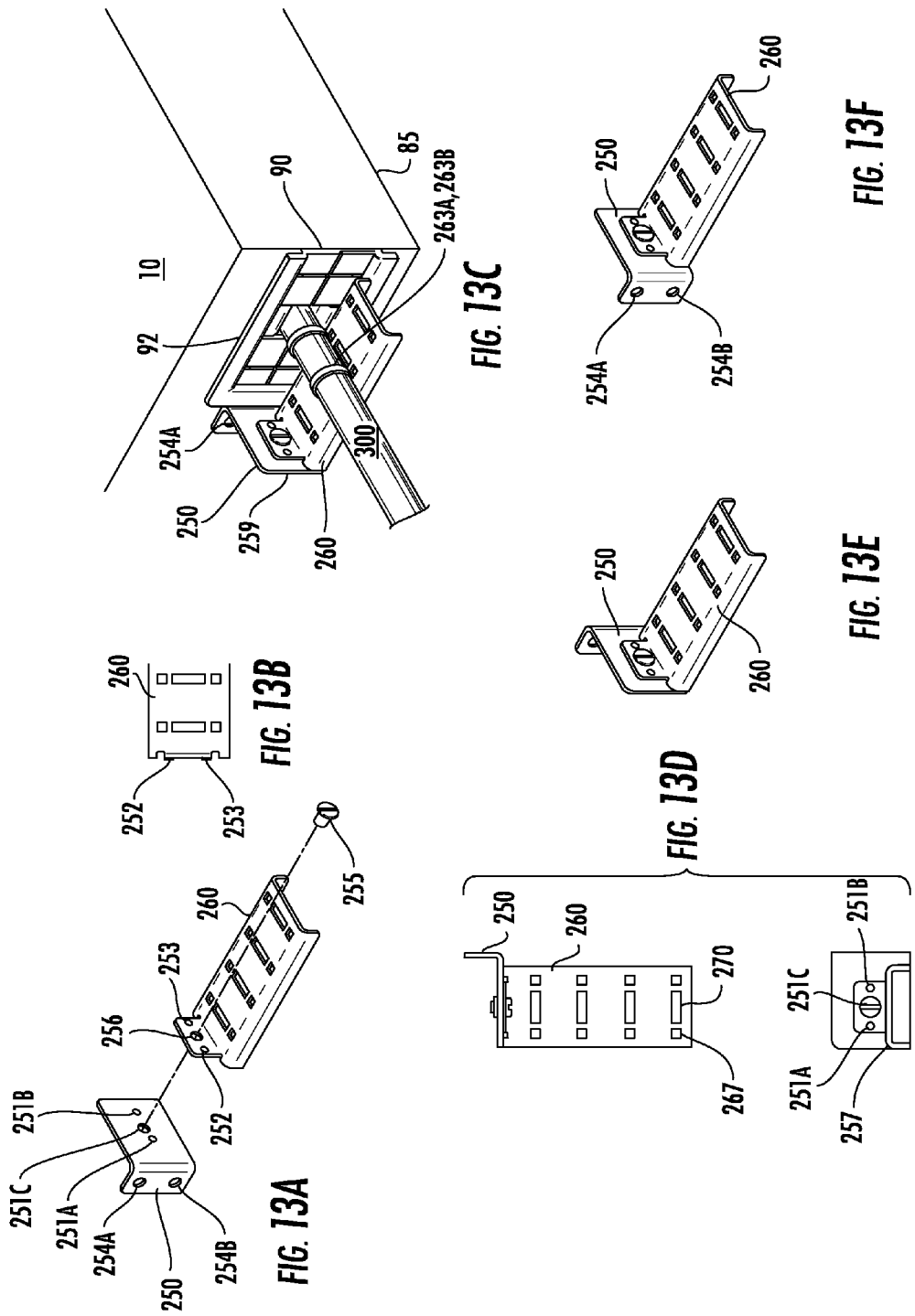

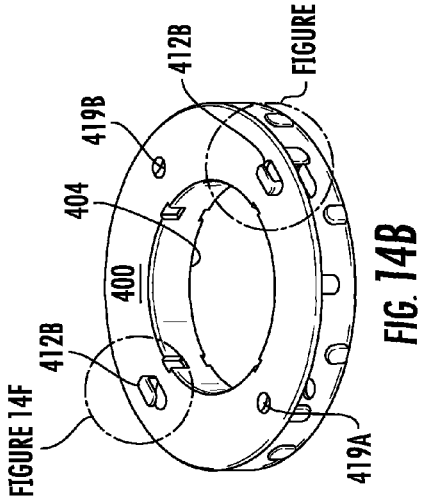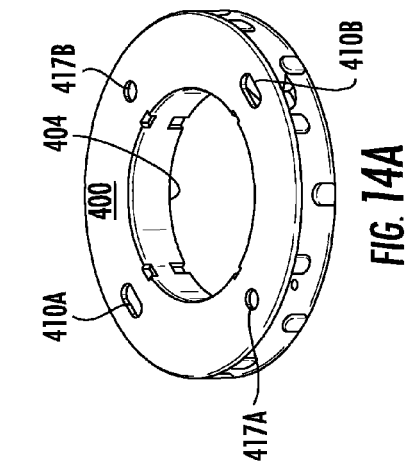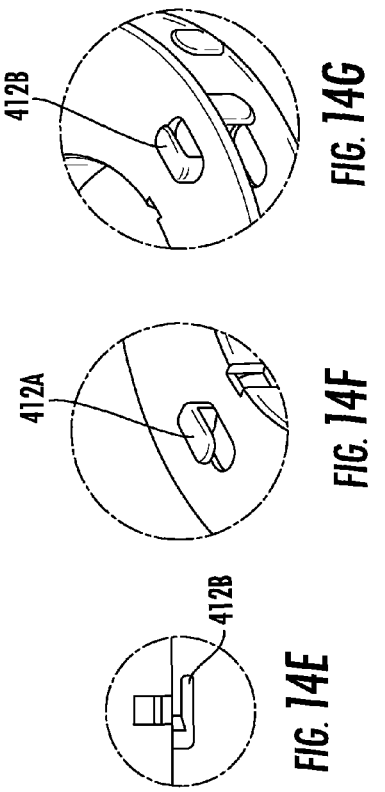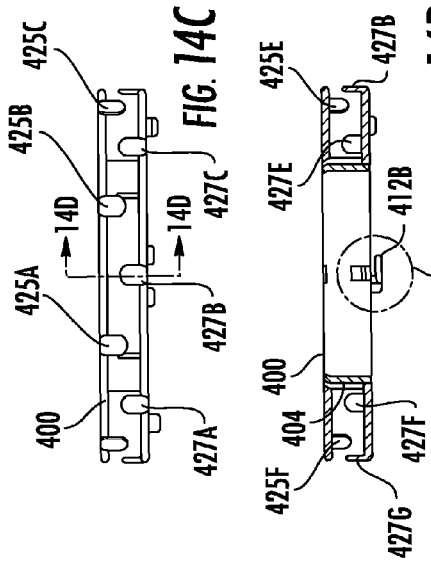

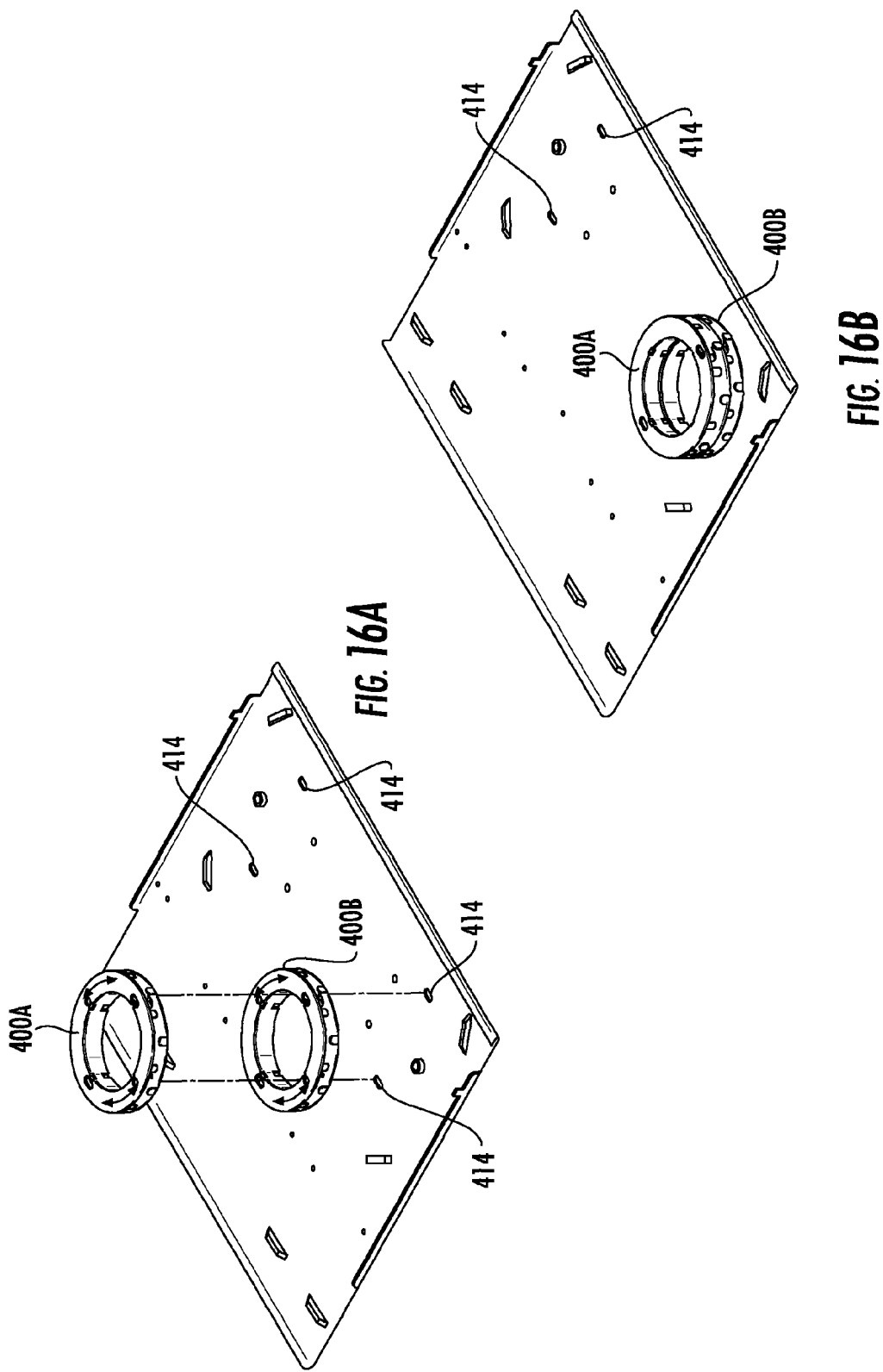

FIBER OPTIC CONNECTIVITY SYSTEM

This patent application is based on and claims priority to provisional patent application Ser. No. 61/934,247 filed on Jan. 31, 2014.

BACKGROUND OF THE INVENTION

1. Field of the Invention

The invention relates to the field of cabinets for both rack mount and wall mount fiber optic installations that utilize both fiber optic splices and fiber optic couplers and management and storage of fiber optic cable.

2. Discussion of the Related Art

Cabinets for fiber optic connections and terminations are commonplace in the art of optical transmission systems, but as data networks become more complex, the need for efficiency in fiber optic cable management grows Cabinets for modern fiber optic systems require capacity for more cable entry and exit routes, additional space for connection and termination equipment, better access for maintenance, new techniques for security, and advancements in protective features that prevent contamination and system degradation due to unwanted physical forces on the cables.

Prior developments in fiber optic cable management have focused more heavily on cable features and relied less on cabinet advancements to maximize optical data transmission. For example, U.S. Pat. No. 7,505,664 (Weinert 2009) incorporates termination features that allow interoperability between cable installations from different manufacturers with a maneuverable "flap" arrangement at cable ends. U.S. Pat. No. 7,668,431 (Cox 2010) illustrates how limited cabinet advancements have traditionally developed in its description of grommets through which cables enter and exit cabinets. According to the Cox '431 patent, prior art grommets have required sealants applied to the grommet and cable intersection to ensure protection against dirt and grime entering the enclosure. Cox attempts to alleviate this problem by incorporating grommets into a panel that holds and releases individual grommets in keyhole type structures. Cox's panels fit within openings in the enclosure. Still, however, Cox requires a two part grommet and panel construction with particular shapes so that the interchangeable components seal properly with cable therein. Accordingly. Cox's grommet configuration utilizes a one way construction for either cable entry or exit but not both.

There continues to be a need in the art of fiber optic cable cabinets for features that provide better access to the fiber cables while providing system integrity and accuracy.

SUMMARY OF THE INVENTION

One form of the present invention is directed to a fiber optic cable cabinet assembly including a main chassis surrounding an interior cavity and including a main opening and a plurality of access points; a door assembly adjacent to the main opening including at least one mounting accessory aperture that is sized and configured for engaged receipt of a mounting accessory component, and said door assembly being selectively positionable between a closed position and an open position for accessing the interior cavity; a tray supported on a rail on the interior facing surface of the main chassis, and the tray being selectively slideable upon the rail; a plurality of grommets each being integrally secured within a respective one of the access points, and each of the grommets being sized and configured for passage of at least one cable therethrough; and an adapter bracket on the tray being sized and configured for accommodating at least one fiber optic adapter plate thereon.

Another form of the present invention is directed to a fiber optic connectivity system for fiber optic cable management including a main chassis surrounding an interior cavity and including a main opening and a plurality of access points each defined by an opening extending between the inner and outer facing surfaces; a door assembly adjacent to the main opening including at least one mounting accessory aperture that is sized and configured for engaged receipt of a mounting accessory component, and the door assembly being selectively positionable between a closed position and an open position for accessing the interior cavity through the main opening; a tray supported on at least one rail, and the tray being selectively slideable upon the rail; a plurality of slits in the inner facing surface of the main chassis and in the tray; and a plurality of grommets each being integrally secured within a respective one of the plurality of access points, and each of the plurality of grommets being sized and configured for passage of at least one cable therethrough.

BRIEF DESCRIPTION OF THE DRAWINGS

For a fuller understanding of the nature of the present invention, reference should be made to the following detailed description, taken in conjunction with the accompanying drawings in which:

FIG. 5 is a partially exploded perspective view illustrating the components of the fiber optic cable cabinet assembly including a rear cover of the present invention in accordance with one embodiment;

FIG. 6A is an isolated perspective view of a tray rail component of the fiber optic cable cabinet assembly of the present invention;

FIG. 6B is a perspective view of the fiber optic cable cabinet assembly of the present invention;

FIG. 6C is an isolated perspective view of a lug component of the fiber optic cable cabinet assembly of the present invention;

FIG. 88 is a side elevational view of a grommet;

FIG. 90 is a side elevational view of a grommet;

FIG. 11A is a perspective view of a fiber optic coupler adapter plate;

FIG. 11B is a top plan view of a fiber optic coupler adapter plate;

FIG. 11D is a side elevational view of a fiber optic coupler adapter plate;

FIG. 11D is a front elevational view of a fiber optic coupler adapter plate;

FIG. 12A is an isolated perspective view taken from FIG. 12F illustrating hook components of the adapter bracket;

FIG. 12B is a sectional view taken from line 12B-12B on FIG. 12D;

FIG. 12C is an isolated view of the hook component taken from FIG. 12B;

FIG. 12D is a front elevational view of an adapter bracket;

FIG. 12E is a partially exploded perspective view of an adapter bracket;

FIG. 12F is a partially exploded perspective view of an adapter bracket;

FIG. 12G is an isolated view taken from FIG. 12F;

FIG. 13A is an exploded view of a strain relief bracket and a mounting bracket;

FIG. 13B is an isolated top plan view of the strain relief bracket;

FIG. 13C is a perspective view of the main cabinet chassis illustrating the strain relief bracket and mounting bracket secured thereto;

FIG. 13D is a top plan view of the strain relief bracket;

FIG. 13E is a perspective view of the strain relief bracket according to one embodiment:

FIG. 13F is a perspective view of the strain relief bracket according to one embodiment;

FIG. 14A is a perspective view of the top portion of a fiber storage hoop;

FIG. 14B is a perspective view of the bottom portion of a fiber storage hoop;

FIG. 14C is a side elevational view of a fiber storage hoop;

FIG. 14D is a sectional view taken from line 14D-14D in FIG. 14C;

FIG. 14E is an isolated view taken from FIG. 14D illustrating a mounting foot;

FIG. 14F is an isolated view taken from FIG. 14B illustrating a mounting foot;

FIG. 14G is an isolated view taken from FIG. 14B illustrating a mounting foot;

FIG. 16A is an exploded perspective view of a first and second storage hoop and the floor of the main cabinet chassis; and FIG. 16B is a perspective view of a first and second storage hoop secured to the floor of the main cabinet chassis.

Like reference numerals refer to like parts throughout the several views of the drawings.

DETAILED DESCRIPTION

Referring to the several views of the drawings, the fiber optic cable connectivity assembly of the present invention is shown and is generally indicated as 10.

The fiber optic cable cabinet assembly (10) disclosed herein includes numerous structural advancements that provide improved efficiencies in fiber optic cable management and ease of installation. Without limiting the invention to any one concept or structure, the overall outline of features includes (i) labeling structure for cabinet identification; (ii) a sliding rail adapter plate configuration; (iii) a grommet with a dual access flap for cable entry and exit; (iv) mounting bracket for cable support; and (v) stackable reels for excess cable in the cabinet enclosure. These and other features of the cabinet construction are set forth below.

Figure 1:
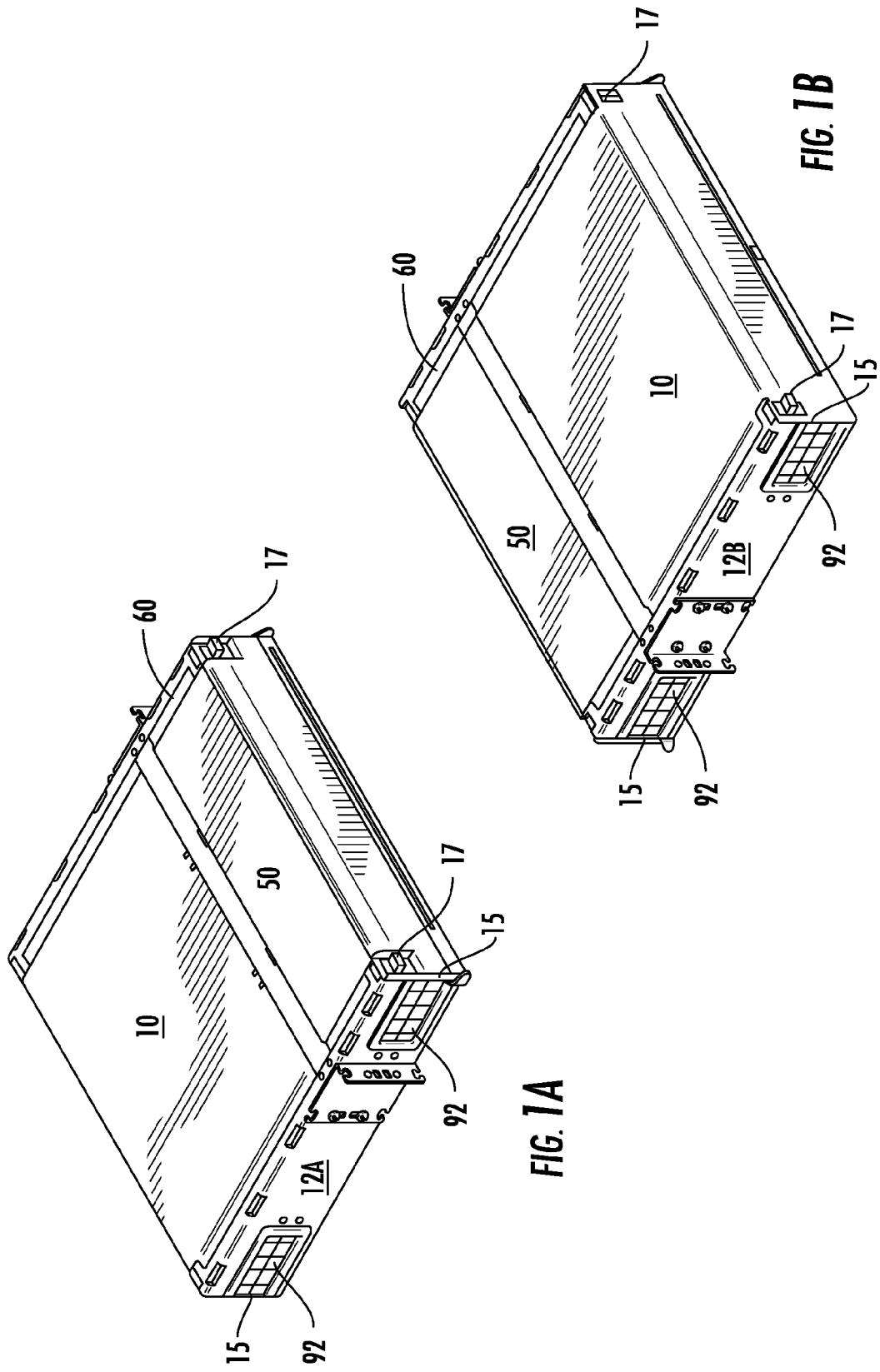
FIG. 1A is a front perspective view showing the fiber optic cable cabinet assembly of the present invention in accordance with one embodiment.
FIG. 1B is a rear perspective view showing the fiber optic cable cabinet assembly in accordance with the embodiment illustrated in FIG. 1A.

FIGS. 1A and 1B present an overview of the cabinet (10) that incorporates the features delineated above. Of note, FIGS. 1A (front view) and 1B (corresponding rear view) show a cabinet (10) that can be sized to fit standard racks, including either a 19 inch or 23 inch rack, and can house fiber optic terminations whether by splice or coupler. The cabinets (10) are also compatible with wall mount hardware, Access points (15) for cable entry and exit are provided within the cabinet (10), and in one non-limiting embodiment, the access points (15) are configured as four corner openings within side walls (12A, 12B) of the cabinet (10). Front door assemblies and rear walls of these kinds of cabinets may accommodate mounting accessories (17).

Figure 2:
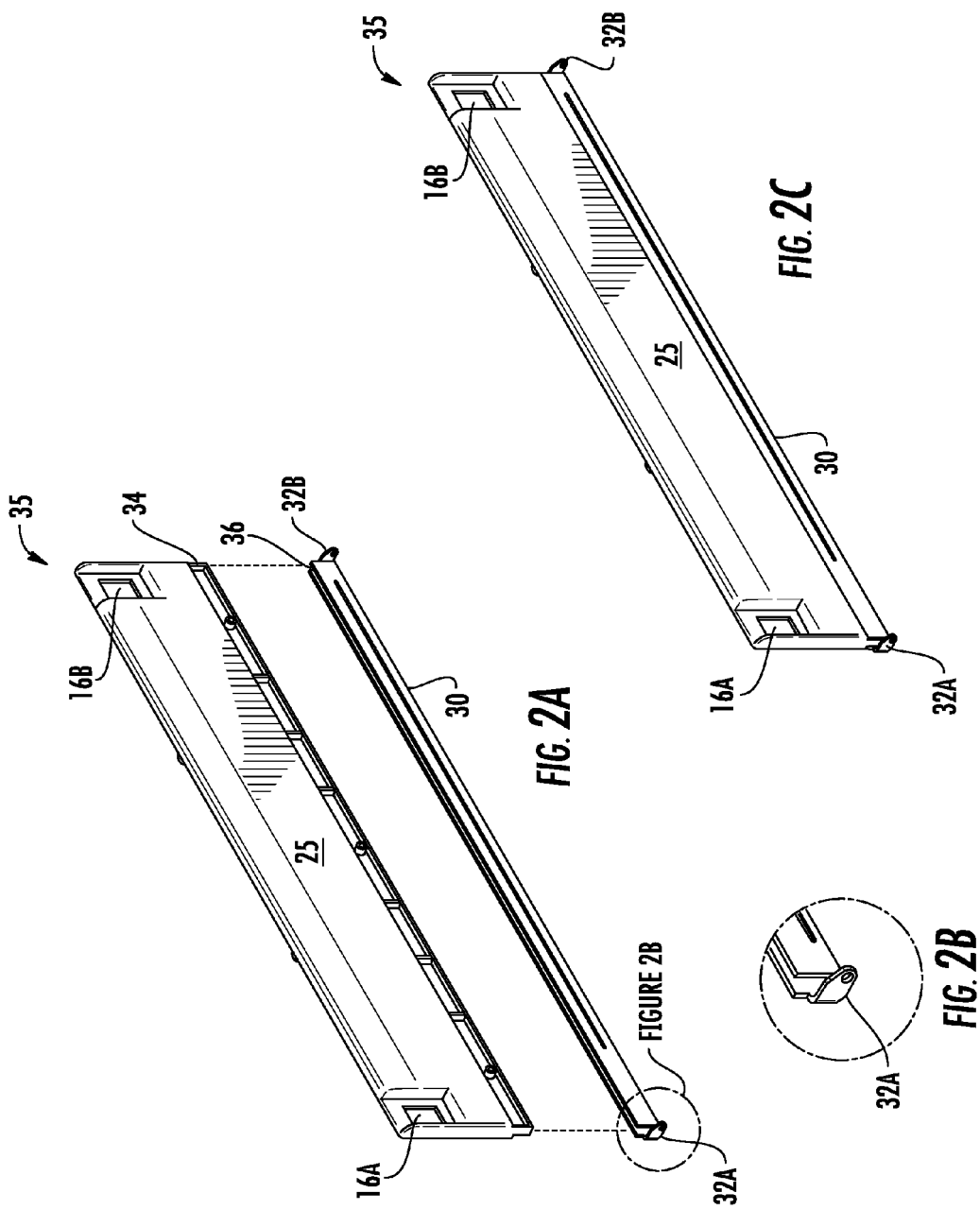
FIGS. 2A-2C are isolated perspective views of the front door of the fiber optic cable cabinet assembly of the present invention.
Figure 3:
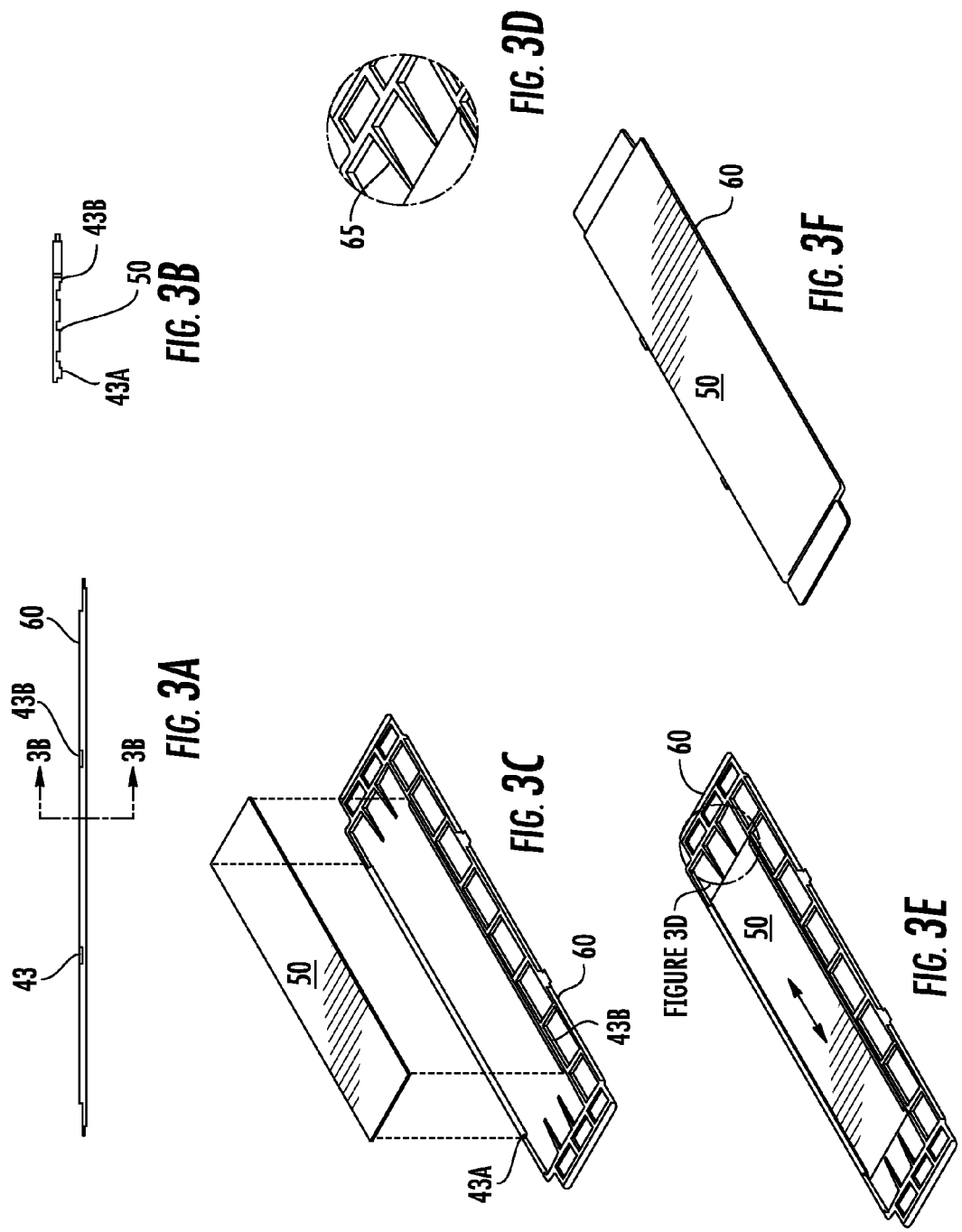
FIG. 3A is a front elevational view of the sliding top cover of the fiber optic cable cabinet assembly of the present invention.
FIG. 3B is a side elevational view of the sliding top cover of the fiber optic cable cabinet assembly of the present invention.
FIG. 3C is a partially exploded perspective view of the sliding top cover and separated labeling surface identification card of the fiber optic cable cabinet assembly of the present invention.
FIG. 3D is an isolated perspective view of the wedged gussets of the sliding top cover of the fiber optic cable cabinet assembly of the present invention.
FIG. 3E is a perspective view of the sliding top cover of the fiber optic cable cabinet assembly of the present invention.
FIG. 3F is a perspective view of the sliding top cover of the fiber optic cable cabinet assembly of the present invention.

In regard to the front of a cabinet (10) as disclosed herein, FIG. 2 and FIG. 3 illustrate the front of the cabinet (10) having a front door (35) with a metal frame base (30) that defines a base groove (36) into which one end (34) of an insert (25) fits therein to complete the door assembly (35) as shown in FIG. 2C. Hinges (32A, 32B) attach to the cabinet (10) at opposite ends of the door (35) for hinged open and close functionality. The insert (25) defines openings (16A, 16B) through which the mounting accessories (17) fit. The details in FIG. 3 illustrate additional views of the front end of the cabinet (10) facing the user. The front door assembly (35) is hinged so that in a vertical, closed position, the front door engages an edge of a sliding top cover (60). The main chassis (85), therefore, is covered in total by a rear cover (80) and the front door assembly (35) that sandwich a front end cover (60) that slides over the top of the main chassis (85), adjoining the rear cover (80) and the front door assembly (35). The front end cover (60), therefore, mates with the rear cover (80) and completes the overall top cover of the main chassis (85). FIGS. 3A-3F illustrate that the front end cover (60) is adapted to display an identification card (50) having a writing surface thereon that is visible along the top front end of the cabinet. In order to hold the visible identification card (50), the front end cover (60) is molded with a pocket defined by rails, or lips (43A, 43B), on one side of the front end cover (60). The lip feature (43A, 43B) is designed to hold an identification card (50) on which the user can write to identify the contents of the cabinet (10) or other instructions. The front end cover (60) includes not only the pocket formed by the lip feature (43A, 43B) but the pocket is open on opposite ends such that the identification card (50) slides in and out of the pocket along the long axis of the front end cover (60). Wedged gussets (65) are ramp-shaped and positioned alongside the pocket, parallel to the direction in which the card (50) slides in and out, to aid in retaining the identification card (50) in a visible position but allowing the card (50) to be removed by sliding the card out of the pocket from an end. The wedged gussets (65), therefore, are convenient for allowing the card (50) to be edited as appropriate and/or conveniently replaced in the pocket as necessary without disassembling the entire cabinet. FIG. 3F shows that the front end cover (60) is designed to allow the identification card (50) to be visible through the front end cover (60). In one embodiment, appropriate parts of the front door assembly (35) are made from a transparent material, such as clear plastic, for maximum visibility of the contents in the cabinet.

Figure 4:
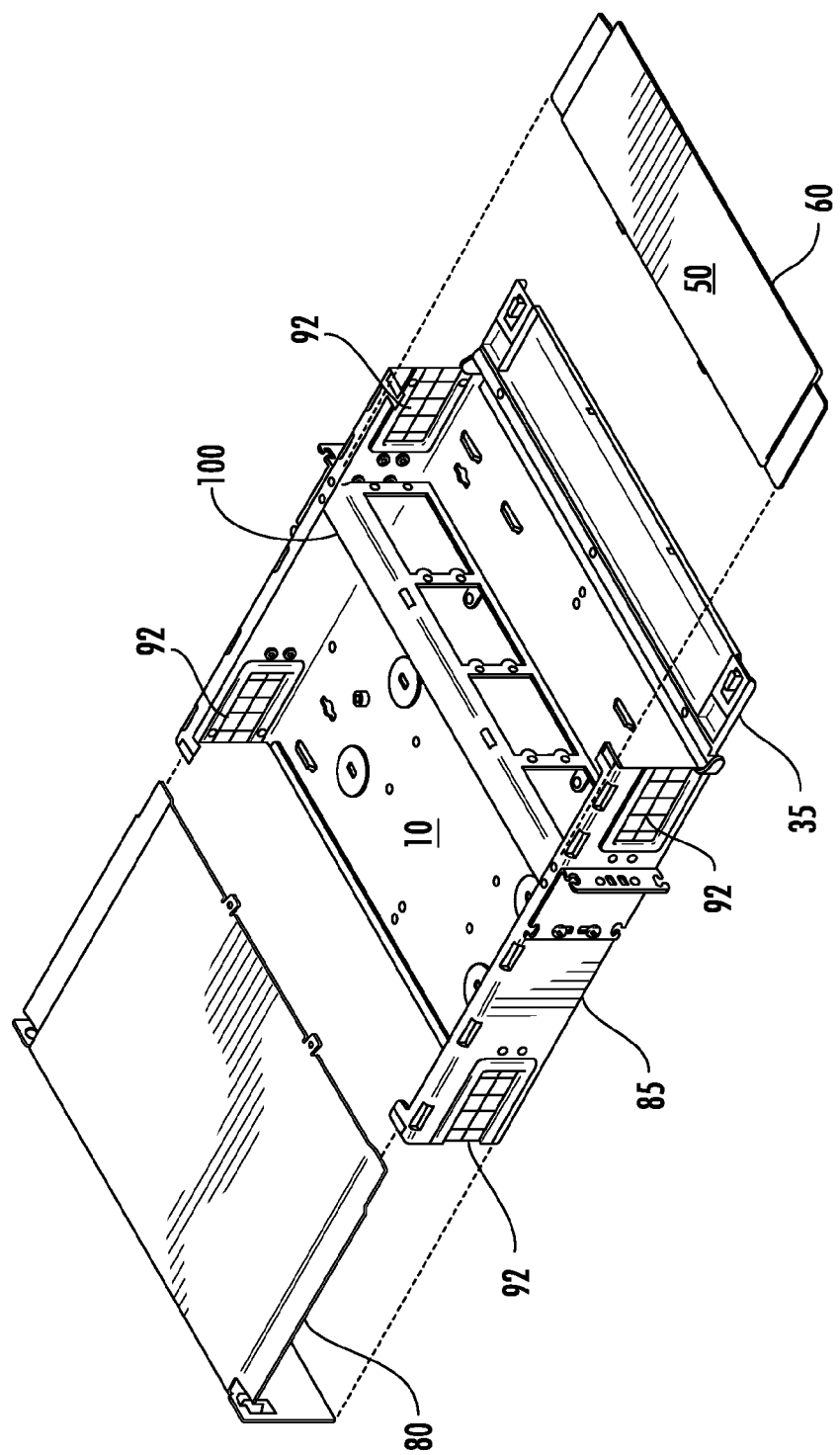
FIG. 4 is a partially exploded perspective view illustrating the components of the fiber optic cable cabinet assembly of the present invention in accordance with one embodiment.

FIG. 4 illustrates how the front cover (60), holding the identification card (50), fits into the front door assembly (35), which utilizes the oppositely positioned hinges (32A, 32B) to open and close for access control. FIG. 4 further shows one embodiment of the cabinet (10) in which the rear cover (80) fits over the main chassis (85) to define the interior chamber of the cabinet. An adapter bracket (100) fits within the cabinet (10) for accommodating fiber optic adapter plates secured within the cabinet, Grommets (92), which are discussed in more detail below, allow for fiber optic cable ingress and egress via access openings (15) in the cabinet. FIG. 5 displays yet another option for allowing secure access to the interior of the cabinet (10) in that tray rails (105A, 105B) are positioned on opposite sides of the cabinet (10) to allow a tray (110) to slide in and out of the cabinet. As shown in FIG. 5, the front door assembly (35) opens downwardly to a near vertical position via hinges (32A, 32B), allowing the sliding tray (110) to move outwardly for easy access to equipment installed on the tray (110).

Figure 7A:
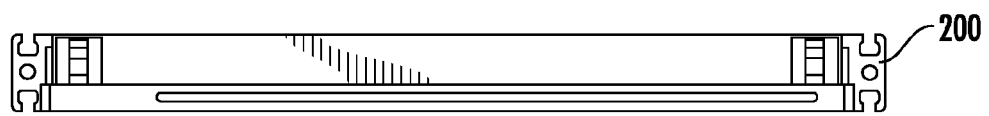
FIGS. 7A-7C are rear elevational views of racks of varying relative size.
Figure 7B:
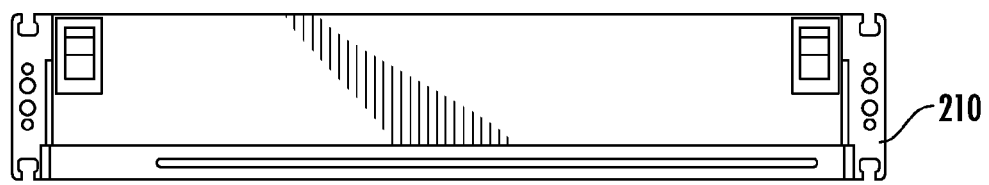
Figure 7C:
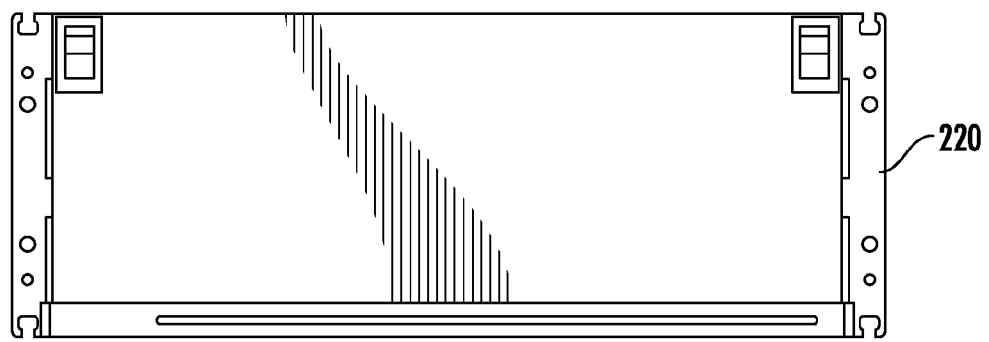

The sliding tray feature of FIG. 5 is further explained in regard to FIGS. 6A-6C. Beginning with FIG. 6A, the tray rails (105A, 105B) define not only the rails on which the tray (110) moves, but the rails (105A, 105B) also incorporate bendable tabs (107A, 107B) at opposite ends of the rails. The tabs (107A, 107B) are bendable to form stop positions for the tray (110), which is manufactured to include lugs (117, FIG. 6C) that engage the bended tabs when the tray is in place so that the tray stops at appropriate points when pulled outward. These tabs (107A, 107B) can be moved (i.e., bent) to a position permitting complete removal of the sliding tray (110) from the mounted chassis (85) if so desired. As noted in FIG. 6B, the tray (110) allows lateral travel for the adapter bracket (100) holding fiber optic connector equipment in the cabinet. By incorporating the sliding tray (110) moving along appropriate rails (105A, 105B), the cabinet (10) disclosed herein provides access to equipment, connections, and cables within the cabinet for ease in maintenance and system integrity. FIG. 6B further illustrates access points (15) for holding grommets (92), and the access points are defined within the side walls of the cabinet by pre-cut sections. All of the previously described features of the cabinet (10) are scalable to accommodate racks of various sizes of rack units (e.g., 1RU, 2RU, and 4RU) as illustrated in the non-limiting example of FIG. 7.

Figure 10:
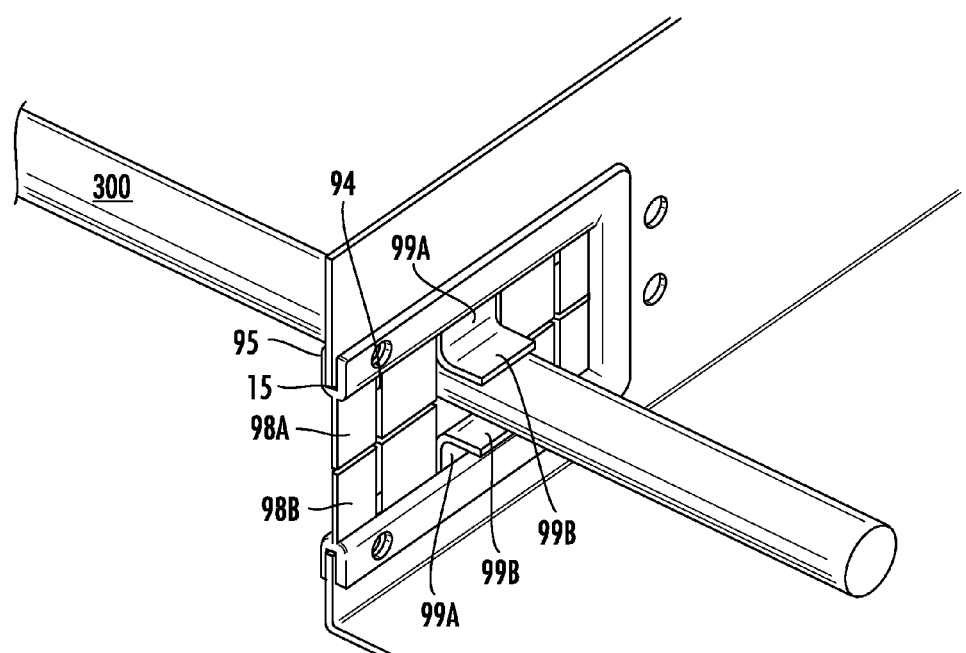
FIG. 10 is a perspective view of a grommet showing passage of a cable between oppositely disposed flaps.

As noted above, one feature of note in the cabinet (10) is its use of grommets (92) for feeding fiber optic cable (300, FIG. 10) into and out of a cabinet (10). The grommets (92) are sized to fit within access points (15) designed within the main chassis (85) of the cabinet. The grommets (92) incorporate bendable flaps (98) through which cables (300) run to enter and exit the main chassis (85). The individual flaps (98A et seq.) are connected to the grommet (92) and each other via spacer sections (94) that further define spaces between the flaps (98A et seq.). Overall, then, each grommet (92) in the examples illustrated herein define a series of flaps (98) in top and bottom rows with sufficient space therebetween for proper access. The flaps (98) therefore, define a spaced grid in the grommet (92) while also providing self-closing dust protection to the cable(s) (300) entering and exiting the main chassis (85). The flaps (98A, 98B, et seq.) are bendable between a top half (99A) and a bottom half (99B), as most clearly shown in FIG. 10. The bendable nature of the flaps (98) provides a natural protective shield over the cable (300).

Figure 8A:
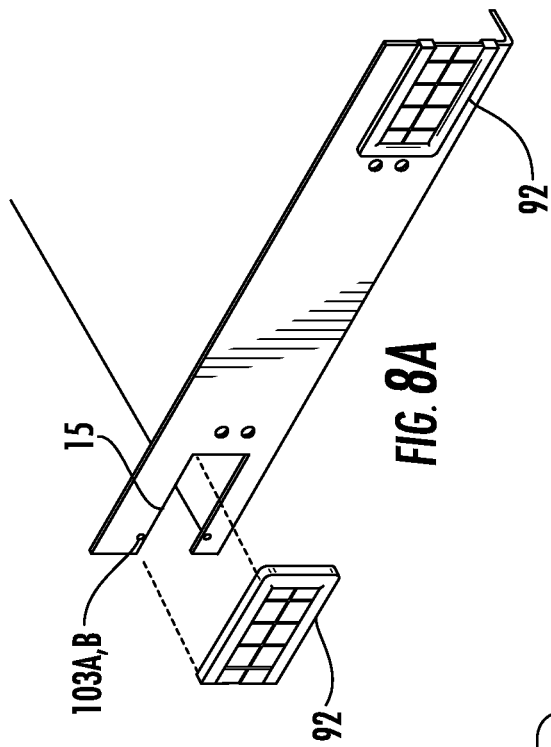
FIG. 8A is a partially exploded perspective view illustrating a first grommet separated from an access point of the main chassis of the fiber optic cable cabinet assembly of the present invention.
Figure 8B:
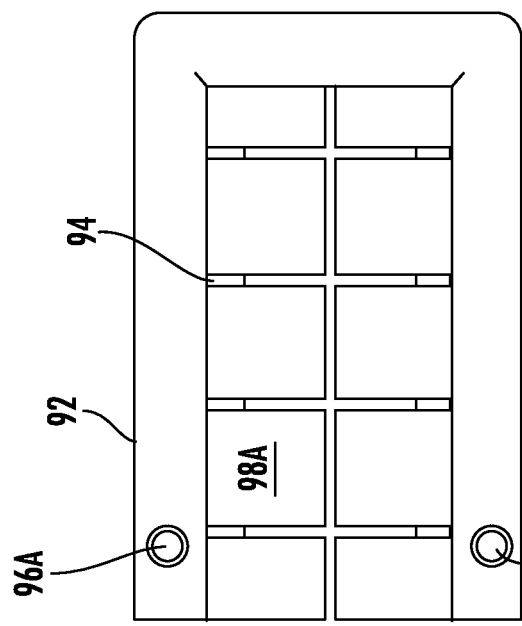
Figure 9C:
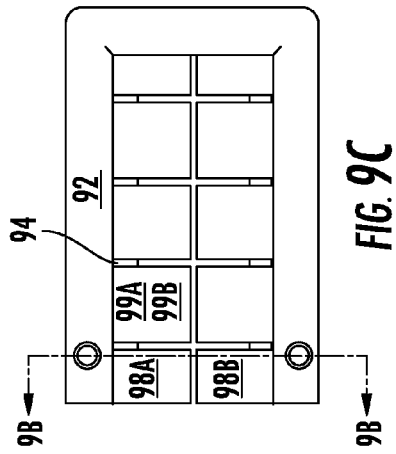
FIG. 9A is a perspective view of a grommet.
FIG. 9B is a sectional view taken from line 9B-9B on FIG. 9C.
FIG. 9D is a perspective view of a grommet.
FIG. 9E is an isolated view of the grommet taken, from FIG. 9B and illustrating a bump component.
Figure 9E:
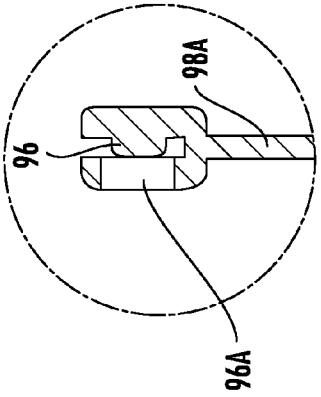
Figure 9B:
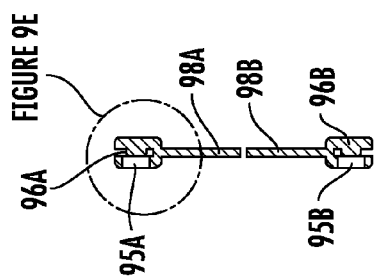
Figure 9A:
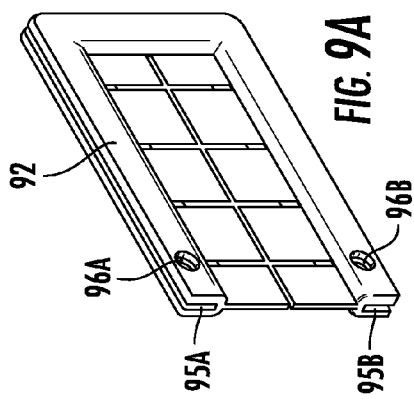
Figure 9D:
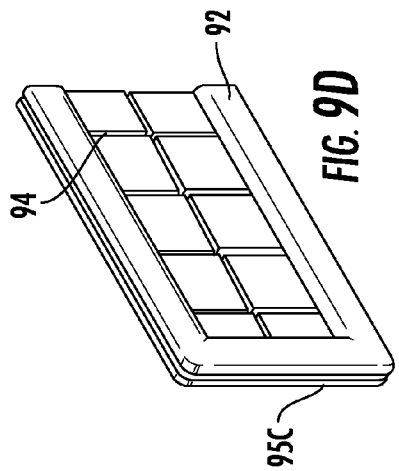

The grommets (92) are designed to be secured to access points (15) cut into the sides of the main chassis (85) of the cabinet (10), as illustrated in FIG. 8A, Additionally, pre-cut holes (103) in the metal of the side walls of the cabinet (10) align with raised knobs, or bumps (96) on the body of the grommet (92) for additional alignment and fixing points. The grommets (92), furthermore, define a peripheral groove around edges that match the cut-out access points (15) of the main chassis (85). The grommets (92), therefore, fit within the access points (15) and attach to the main chassis by fitting an edge of the access points (15) within the peripheral groove (95) of the grommet, as shown, for example, in FIG. 10. The detailed perspective of FIG. 9E illustrates that the grommets (92) define the peripheral grooves around appropriate edges of the respective grommets, and the bump features (96) are positioned within the grommet and within the peripheral grooves. Placing the grommets (92) within a respective access point (15) and fitting the peripheral grooves over an edge of the main chassis (85) also aligns a bump (96) with a pre-cut hole (103) in the main chassis (85). The result is an entirely secure grommet (92) within the cabinet (10).

FIGS. 11 and 12 illustrate additional details of accessories used within the cabinet (10) of this disclosure and possibly other fiber optic enclosures as well. For instance, the adapter bracket (100) within the cabinet defines openings for receiving a fiber optic adapter plate (137), and that fiber optic adapter plate (137) defines coupler openings (145) for receiving fiber couplers and securing the coupling mechanisms to the adapter bracket (100). As shown in FIG. 12A, each adapter plate (137) defines, at a first end, hook features (142A, 142B) that engage over and around lug features (144) defined at an edge of an opening (145) of the adapter bracket (e.g., FIG. 12A). A second end of the adapter plate (137) is in abutment with the opposite side of the adapter bracket (100) and defines an opening (147) for receiving a pin (139) that mates with a corresponding opening (140) in the adapter bracket (100) (e.g., Figures, 12E-12G) such that the first and second ends of corresponding ones of the adapter plates overlap each other.

The cabinet (10) disclosed herein is likewise amenable for using accessories positioned outside the main chassis (85). FIG. 13 illustrates the use of a strain relief bracket (260) that relieves strain on cables (300) entering or exiting the grommet (92) of the cabinet (10), providing increased security of alignment for the coupling or splicing operations within the enclosure. Beginning with FIG. 13A, a strain relief bracket (260) may be mounted via a mounting bracket (250) that is adaptable for either left or right side mounting via appropriately matched bores (251A, 251B, 251C) in the mounting bracket, holes (252, 253, 256) in the strain relief bracket and bolts (e.g., 255) holding the assembly together and holding the assembly to the cabinet (10) via mounting holes (254A, 254B) illustrated in FIG. 13F. FIG. 13C illustrates the mounting bracket (250) holding the strain relief bracket (260) in place on the cabinet (10) so that a cable (300) rests thereon. The strain relief bracket (260) also provides appropriate openings for either cable tie slots (267) or hook and loop strap slots (270) as set forth in FIG. 13D to stabilize a cable on the strain relief bracket with appropriate securing features (263A, 263B) such as ties or straps (FIG. 13C). Forming the peripheral edge of the strain relief bracket (260) with a rounded edge (257) prevents wear on the cable (300) resting thereon should the weight of the cable (300) cause a bend over the edge of the strain relief bracket (260).

Figure 15A:
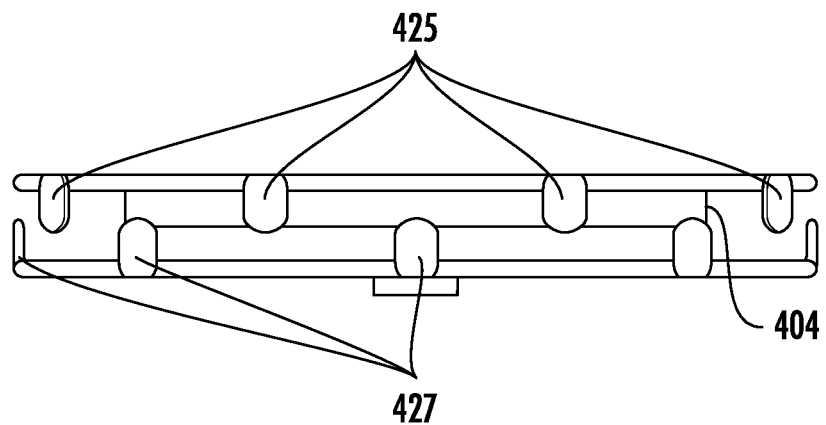
FIG. 15A is a side elevational view of a fiber storage hoop.
Figure 15B:
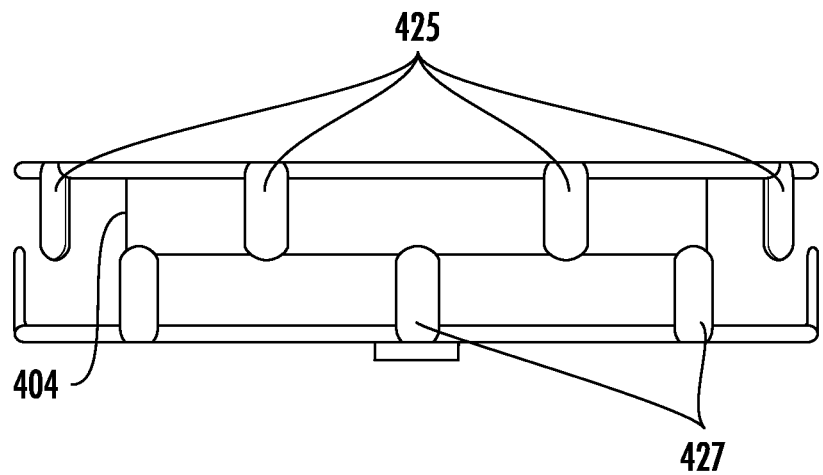
FIG. 15B is a side elevational view of a fiber storage hoop.

FIGS. 14-16 illustrate yet another accessory that may be used with the cabinets (10) disclosed herein or in other kinds of installations as well. The accessory at issue is a customized set of fiber storage hoops (400) to store excess or slack fiber inside a termination cabinet or other fiber optic cabinet. One kind of fiber product wrapped around the hoops (400) of this disclosure would be "subgroup" cables containing multiple individualized fiber cables therein. For example, and without limiting the invention, the hoops (400) may store two to three millimeter (2-3 mm) outer diameter fibers cables that enclose multiple bend tolerant fibers therein. The diameter and storage capacity of each hoop (400) can be scaled as desired. The figures herein illustrate that the hoops (400) are outfitted with mounting feet (412) along an outer surface. The mounting feet (412) can engage slits (414) on the floor of the main cabinet chassis (85) or corresponding and mating holes in other storage hoops, such that hoops can be stacked without rotating in the cabinet. Excess fiber wrapped around the respective spools (404) of the hoops (400) are held in place by staggered teeth (425, 427) on opposite diameters of the hoops (e.g., FIG. 15A). FIG. 15B illustrates a slight offset in the arrangement of the teeth allowing access for wrapping the fibers. The teeth have rounded corners to avoid damaging the fiber cables during the wrapping process. FIG. 16 illustrates how the hoops are installed onto the floor of the cabinet and stacked upon each other.

These features and others achieve new security and integrity for fiber optic connectivity systems in place today.

While the present invention has been shown and described in accordance with several preferred and practical embodiments, it is recognized that departures from the instant disclosure are contemplated within the spirit and scope of the present invention which are not to be limited except as defined in the following claims as interpreted by the Doctrine of Equivalents.

What is claimed is:

1. A fiber optic connectivity system for fiber optic cable management, said fiber optic connectivity system comprising:
a main chassis including an outer facing surface and an inner facing surface surrounding an interior cavity, and said main chassis including a main opening and a plurality of access points each defined by an opening extending between the inner and outer facing surfaces;
a door assembly adjacent to the main opening on said main chassis including at least one mounting accessory aperture that is sized and configured for engaged receipt of a mounting accessory component, and said door assembly being selectively positionable between a closed position and an open position for accessing the interior cavity through the main opening of said main chassis;
a tray supported on at least one rail, the at least one rail being mounted to the interior facing surface of said main chassis, and said tray being selectively slideable upon said at least one rail;
a plurality of grommets each being integrally secured within a respective one of the plurality of access points, and each of said plurality of grommets being sized and configured for passage of at least one cable therethrough; and
an adapter bracket on said tray, said adapter bracket being sized and configured for accommodating a plurality of fiber optic adapter plates each including a first end in abutment with a first side of said adapter bracket and having a hook component that is sized and configured to engage a lug component on said adapter bracket and a second end in abutment with an opposite, second side of said adapter bracket and having a pin that is sized and configured for engaging a corresponding opening in said adapter bracket, and wherein the first and second ends of corresponding ones of said plurality of adapter plates overlap each other.

2. The fiber optic connectivity system as recited in claim 1 wherein said door assembly comprises a base groove frame member and an insert, and said base groove frame member having an elongated channel sized and configured for engaged receipt of said insert.

3. The fiber optic connectivity system as recited in claim 1 wherein each of said plurality of grommets includes at least one bendable flap structured and disposed for permitting passage therethrough of the at least one cable, and wherein said bendable flap provides a protective shield for the at least one cable.

4. The fiber optic connectivity system as recited in claim 1 wherein each of said plurality of grommets includes a plurality of bendable flaps forming a spaced grid of flaps each being structured and disposed for permitting passage therethrough of the at least one cable, and wherein each of said plurality of bendable flaps provides a protective shield for the at least one cable.

5. The fiber optic connectivity system as recited in claim 4 wherein each of said plurality of bendable flaps on one of said plurality of grommets has an oppositely disposed one of said plurality of bendable flaps.

6. The fiber optic connectivity system as recited in claim 1 further comprising a strain relief bracket that is securable to the outer facing surface of said main chassis adjacent to one of said plurality of grommets, and wherein said strain relief bracket is structured and disposed for relieving strain on the at least one cable by supporting the at least one cable at its point of entry or exit through one of said plurality of grommets.

7. The fiber optic connectivity system as recited in claim 1 wherein said tray includes a plurality of slits.

8. The fiber optic connectivity system as recited in claim 7 further comprising at least one fiber storage hoop having a top side, a bottom side and a spool centrally located therebetween, said spool being sized and configured for storing wound cable thereon, and the bottom side of said at least one fiber storage hoop including a plurality of mounting feet each being sized and configured for selective engagement within one of the plurality of slits in said tray for releasable attachment thereto.

9. The fiber optic connectivity system as recited in claim 8 wherein said at least one fiber storage hoop includes a plurality of slits each being sized and configured for engaged receipt of one of said plurality of mounting feet on the bottom side of said at least one fiber storage hoop.

10. A fiber optic connectivity system for fiber optic cable management, said fiber optic connectivity system comprising:
a main chassis including an outer facing surface and an inner facing surface surrounding an interior cavity, and said main chassis including a main opening and a plurality of access points each defined by an opening extending between the inner and outer facing surfaces;

a door assembly adjacent to the main opening on said main chassis including at least one mounting accessory aperture that is sized and configured for engaged receipt of a mounting accessory component, and said door assembly being selectively positionable between a closed position and an open position for accessing the interior cavity through the main opening of said main chassis;

a tray supported on at least one rail, the at least one rail being mounted to the interior facing surface of said main chassis, and said tray being selectively slideable upon said at least one rail;

a plurality of slits in the inner facing surface of said main chassis and in said tray;

a plurality of grommets each being integrally secured within a respective one of the plurality of access points, and each of said plurality of grommets being sized and configured for passage of at least one cable therethrough; and at least one fiber storage hoop having a top side, a bottom side and a spool centrally located therebetween, said spool being sized and configured for storing wound cable thereon, and the bottom side of said at least one fiber storage hoop including a plurality of mounting feet each being sized and configured for selective engagement within one of the plurality of slits in said tray and the inner facing surface of said main chassis for releasable attachment thereto.

11. The fiber optic connectivity system as recited in claim 10 wherein said door assembly comprises a base groove frame member and an insert, and said base groove frame member having an elongated channel sized and configured for engaged receipt of said insert.

12. The fiber optic connectivity system as recited in claim 10 further comprising an adapter bracket on said tray, said adapter bracket being sized and configured for accommodating at least one fiber optic coupler thereon.

13. The fiber optic connectivity system as recited in claim 12 wherein said at least one fiber optic coupler is at least one fiber optic adapter plate including a first end having a hook component that is sized and configured to engage a lug component on said adapter bracket and a second end having a pin that is sized and configured for engaging a corresponding opening in said adapter bracket.

14. The fiber optic connectivity system as recited in claim 10 wherein each of said plurality of grommets includes at least one bendable flap structured and disposed for permitting passage therethrough of the at least one cable, and wherein said bendable flap provides a protective shield for the at least one cable.

15. The fiber optic connectivity system as recited in claim 10 wherein each of said plurality of grommets includes a plurality of bendable flaps forming a spaced grid of flaps each being structured and disposed for permitting passage therethrough of the at least one cable, and wherein each of said plurality of bendable flaps provides a protective shield for the at least one cable.

16. The fiber optic connectivity system as recited in claim 15 wherein each of said plurality of bendable flaps on one of said plurality of grommets has an oppositely disposed one of said plurality of bendable flaps.

17. The fiber optic connectivity system as recited in claim 10 further comprising a strain relief bracket that is securable to the outer facing surface of said main chassis adjacent to one of said plurality of grommets, and wherein said strain relief bracket is structured and disposed for relieving strain on the at least one cable by supporting the at least one cable at its point of entry or exit through one of said plurality of grommets.

18. The fiber optic connectivity system as recited in claim 10 wherein said at least one fiber storage hoop includes a plurality of slits each being sized and configured for engaged receipt of one of said plurality of mounting feet on the bottom side of said at least one fiber storage hoop.

* * * * *